United States Patent [19]
Vandenberg et al.

[11] 3,962,575
[45] June 8, 1976

[54] RADIAL ARM MILK HOSE SUPPORT

[76] Inventors: Ben W. Vandenberg, 17226 Roseton Ave.; August Vandenberg, 17306 Roseton Ave., both of Artesia, Calif. 90701; Andrew W. Vandenberg, 15751 Ryon St., Bellflower, Calif. 90706

[22] Filed: Feb. 26, 1975

[21] Appl. No.: 553,229

[52] U.S. Cl. ............................ 248/340; 403/76; 403/90; 403/141
[51] Int. Cl.² ........................................ B42F 13/00
[58] Field of Search ............ 248/288 A, 288 B, 303, 248/215, 340, 304, 339, 341, 288 R; 403/141, 142, 131, 130, 133, 90, 76

[56] References Cited
UNITED STATES PATENTS

| | | | |
|---|---|---|---|
| 549,731 | 11/1895 | Lantau | 403/141 |
| 1,158,846 | 11/1915 | Punch | 403/141 |
| 1,280,013 | 9/1918 | Goddard | 248/288 B |
| 1,713,835 | 5/1929 | Krieg | 248/341 |
| 1,735,212 | 11/1929 | Pawsat | 248/288 B |
| 2,029,532 | 2/1936 | Karcher | 403/141 |
| 3,251,570 | 5/1966 | Frost et al. | 248/288 R |
| 3,721,415 | 3/1973 | Chapkovich et al. | 248/288 A |
| 3,849,009 | 11/1974 | Bourdon | 403/133 |

*Primary Examiner*—James T. McCall
*Assistant Examiner*—Darrell Marquette
*Attorney, Agent, or Firm*—Mahoney, Schick & Cislo

[57] ABSTRACT

A downwardly extending radial arm having a hook-shaped end portion for engaging milk hoses is secured to a generally horizontal cow stall mounting rail by a self-lubricating ball and socket joint. The ball is secured to the mounting rail by a diametrically extending bolt either received through the mounting rail or through a sleeve around the rail. The socket member is formed of separable halves which upwardly clamp the ball and downwardly clamp an upper end of the support arm by a clamping bolt extending through the socket member halves.

3 Claims, 6 Drawing Figures

RADIAL ARM MILK HOSE SUPPORT

BACKGROUND OF THE INVENTION

This invention relates to a radial arm milk hose support construction used for supporting the milk hoses of automatic milkers at the individual cow stalls of a cow barn. More particularly, the radial arm milk hose support construction of the present invention includes a downwardly projecting milk hose support arm connected to an overlying cow stall mounting rail through a unique, conveniently adjustable, ball and socket arrangement wherein the milk hose support arm may be conveniently adjusted to extend in virtually any downward direction from the mounting rail so as to retain and support the milk hoses in the most efficient position relative to the particular milking claw of an automatic cow milker.

Various forms of radial arm milk hose supports have heretofore been provided in conjunction with the milking claws of automatic milkers at the individual cow stalls. Generally, the purpose thereof is to support the milk hoses arranged between a particular milk claw operably attached to a cow's udder and the milk receiving pipe system as presently used in automated milk cow barns. It is important that these radial arms for supporting the milk hoses be relatively closely adjacent the particular milk cow and cow's udder in order that a proper tension will be retained on the milk hoses and transmitted directly to the milk claw in view of the fact that such tension directly affects the cow's production of milk by obtaining a more complete milk-out of the particular cow.

In other words, if the tension on the milk hoses directly adjacent the milk claw during the milking operation is improper, complete milking-out of the cow by the automatic milker is greatly inhibited. Each milk hose tensioning during the initial attachment of the milking claw to the particular cow's udder must be closely predicated and adjusted to such proper tensioning for an efficient operation of the particular milking claw and an overall complete milking operation. For this reason, the milk hose supporting radial arms adjacent each of the cow stalls must be individually closely adjusted for proper milk hose support at the start of each milking operation.

One of the more commonly used milk hose supporting radial arms previously used prior to the present invention has been one which requires two basic adjusting operations at spaced locations thereon in order to obtain proper milk hose tensioning and support thereby. All of the radial arm constructions provided for this purpose are supported on a generally horizontally extending cow stall mounting rail and this commonly used prior construction has been attached at the side of the cow stall mounting rail by a vertical pin or bolt providing horizontal pivoting of the downwardly extending hose support radial arm and spaced therebeneath, a second horizontally extending pivot pin or bolt providing generally vertical angular adjustment for the downwardly extending radial arm. Obviously, although theoretically a form of universal adjustment for the radial arm can be provided by this arrangement, the specific adjustment of a particular radial arm in order to obtain exact precise milk hose tensioning and support is quite a cumbersome adjustment operation. It can be seen that horizontal adjustments through the upper vertical bolt must be obtained, then vertical angular adjustments through the lower horizontal bolt must be obtained and this multiple adjustment bolt procedure possibly repeated numerous times until the exact desired milk hose tensioning and support is obtained, all resulting in quite a complex radial arm adjustment operation.

OBJECTS AND SUMMARY OF THE INVENTION

It is, therefore, an object of this invention to provide a radial arm milk hose support construction which permits easy and efficient universal radial arm adjustment through a single adjustment bolt so that the proper adjustment for the radial arm may be quickly and easily obtained without the necessity of a lengthy adjustment operation. The downwardly extending radial arm with the usual lower hose engagement means thereon may be pivoted in all directions, both horizontally and angularly vertically, as well as all combined movements thereof through a single universal pivot joint. Thus, proper attachment of the milk claw to the particular cow's udder followed by exact proper milk hose tensioning and support is easily and efficiently obtained assuring the maximum milk-out of each individual cow.

It is a further object of this invention to provide a radial arm milk hose support construction wherein the universal pivotal attachment of the radial arm to the horizontal cow stall mounting rail is obtained by a unique and conveniently adjustable ball and socket arrangement. Furthermore, in the preferred form, the ball may be mounted firmly attached to the horizontal cow stall mounting rail by means of a securing bolt diametrically therethrough positioning the ball spaced below the mounting rail. Still in the preferred form, the socket is formed by preferably a two-piece socket member having a single adjustment bolt extending between the two socket parts which when brought into securement, frictionally clamps the two socket parts over the ball at an upper portion thereof and firmly clamps the upper end of the supporting arm at a lower portion thereof. The universal adjustment between the ball and socket members thereafter permits the efficient universal adjustment of the radial arm.

It is still a further object of this invention to provide a radial arm milk hose support construction providing all of the foregoing advantages and unique features of construction, yet, again in the preferred form, may be fabricated from modern, long protecting materials highly resistant to usual deterioration. Basically, the ball and socket components, as well as any attaching sleeves for attaching the assembly to the cow stall mounting rail may be formed of one of the modern plastics, preferably a modern self-lubricating plastic such as nylon. With the ball and socket members formed of the self-lubricating plastic, normal lubrication for these selectively adjustable parts is completely eliminated. At the same time, the support arm and the various bolt members are preferably formed of metal rust resistant zinc or cadmium plated so as to be highly resistant to corrosion.

These and further objects of the invention will become readily apparent from the drawings taken in conjunction with the hereinafter following commentary.

DESCRIPTION OF THE BEST EMBODIMENTS CONTEMPLATED

Figure 1:
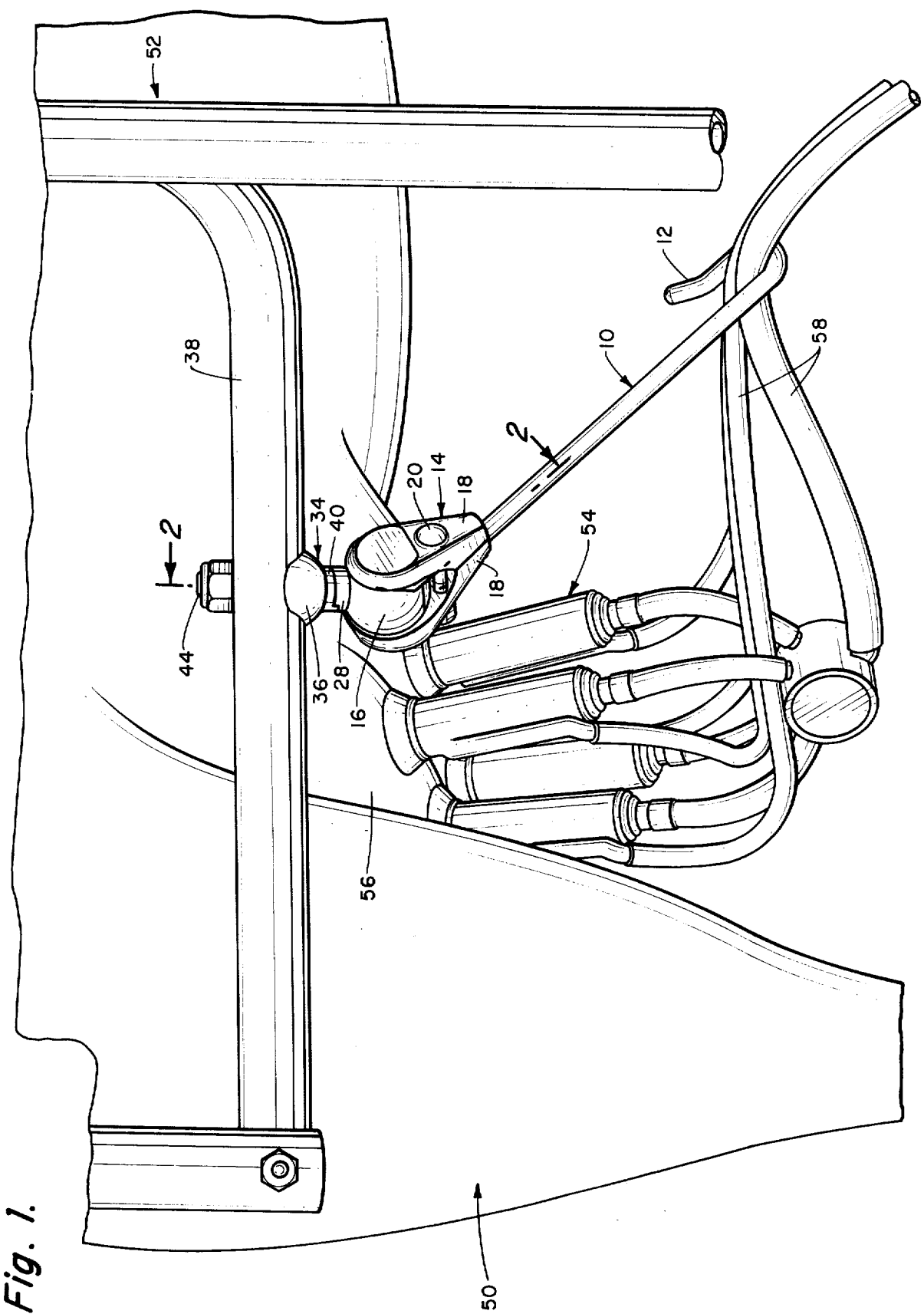
FIG. 1 is a fragmentary, side elevational view of a typical cow stall having a cow to be milked positioned therein and with one preferred embodiment of the radial arm milk hose support construction of the present invention mounted on the horizontal cow stall mounting rail in operable position retaining the milk hoses of a milk claw attached to the cow's udder in proper milking position.
Figures 2, 3:
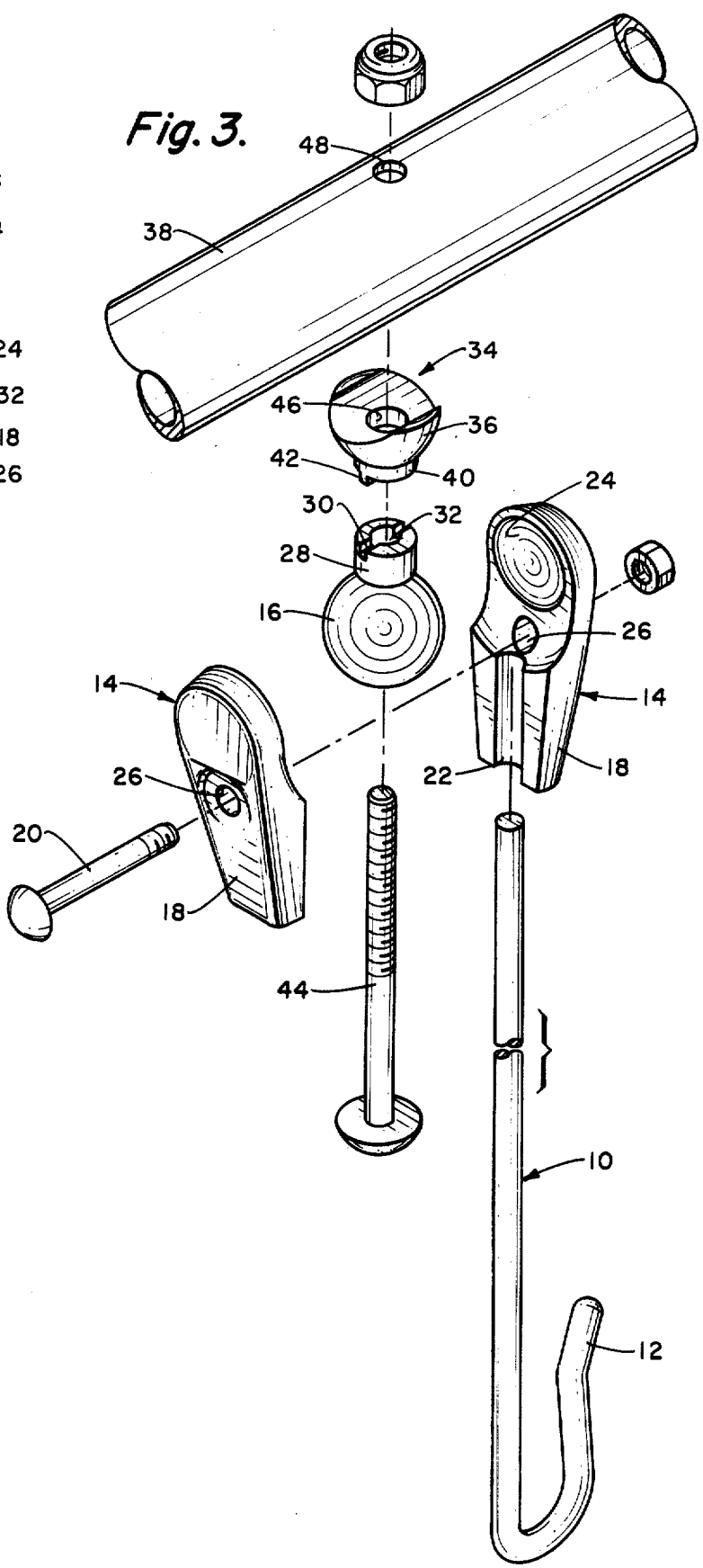
FIG. 2 is an enlarged, fragmentary, vertical sectional view of the radial arm milk hose support construction of FIG. 1 looking in the direction of the arrows 2—2 in FIG. 1.
FIG. 3 is a fragmentary, exploded view of the radial arm milk hose support construction of FIG. 1.

Referring to FIGS. 1 through 3 of the drawings, one embodiment of a radial arm milk hose support construction is illustrated therein incorporating certain of the principles of the present invention. Furthermore, the first preferred embodiment form of the radial arm milk hose support construction, as well as the second preferred form thereof to be hereinafter referred to and described, is fabricated by usual manufacturing procedures and from appropriate materials well known to those skilled in the art, except as hereinbefore or hereinafter specifically pointed out.

As shown in FIGS. 1 through 3, the first embodiment of the radial arm milk hose support construction includes a downwardly projecting milk hose support arm generally indicated at 10 preferably formed rod-like and having a lower milk hose engaging hook 12 at a lower extremity thereof. The upper end of the support arm 10 is a plain end and is clamped in the overall hose support construction by an intermediate universally selectively adjustable, arm clamping assembly generally indicated at 14. The length of the support arm 10 may be any usual length appropriate for the particular environment of the hose support construction in order to carry out its intended hose supporting purpose, all to be hereinafter discussed more in detail.

The arm clamping assembly 14 is comprised of a ball 16, two preferably generally identical socket member halves 18 and an adjustment bolt 20. As shown in FIGS. 2 and 3, the lower portions of the socket member halves 18 are formed with vertical rod channels 22 which match when the halves are brought horizontally together toward abutment. The upper portions of the socket member halves 18 are formed with oppositely facing and matching, arcuate ball sockets 24 spaced horizontally apart in final assembly sufficient so as to conform to and frictionally clamp sides of the ball 16. Spaced generally between the rod channels 22 and ball sockets 24, the socket member halves 18 are formed with horizontally aligned bolt holes 26 for receiving the adjustment bolt 20 therethrough to selectively clamp the socket member halves together in assembly.

The ball 16 is spherical with a mounting cylinder or sleeve 28 secured diametrically aligned on an upper surface thereof. The upper surface of the mounting cylinder 28, in turn, has a radially extending notch 30 formed therein. The ball 16 is completed by a vertical, diametrical opening 32 extending vertically through the ball and axially through the mounting cylinder 28.

An arm mounting assembly generally indicated at 34 overlies the arm clamping assembly 14 and is comprised, in this first embodiment form, of a mounting pad 36 formed upwardly concave to conform to the outer cylindrical surface of a generally horizontal, cow stall mounting rail 38. Downwardly, the mounting pad 36 has secured thereto a mounting cylinder 40 facing the mounting cylinder 28 of the ball 16 in the overall assembly. Furthermore, the mounting cylinder 40 of the mounting pad 36 has a downwardly projecting lug 42 predicated to downwardly engage in the notch 30 of the mounting cylinder 28 on the ball 16 in the overall assembly. The arm mounting assembly 34 is completed by a vertically extending mounting bolt 44 sufficiently long to be received from beneath upwardly through the opening 32 through the ball 16, a center opening 46 through the mounting pad 36 and a diametrical opening 48 through the cow stall mounting rail 38, all of which will be hereinafter explained in the mounting procedure.

In the assembly and the mounting of this first embodiment form of the radial arm milk hose support construction of the present invention on the cow stall mounting rail 38 in operable position, the diametrical opening 48 through the cow stall mounting rail is formed generally properly located relative to the usual position of a cow 50 standing in a cow stall 52 adjacent the cow stall mounting rail 38 as generally shown in FIG. 1. The ball 16 of the arm clamping assembly 14 and the mounting pad 36 of the arm mounting assembly 34 are then properly assembled with the ball notch 30 receiving the mounting pad lug 42 and the assembly is brought into alignment against the lower surface of the cow stall mounting rail 38 aligned with the mounting rail opening 48. The mounting bolt 44 is then inserted upwardly through the ball 16, through the mounting pad 36 and through the cow stall mounting rail 38 with usual securement to firmly mount the assembly of the ball 16 and mounting pad 36 on the cow stall mounting rail 38.

Next, the socket member halves 18 of the arm clamping assembly 14 are brought into assembly with the ball 16 engaged in the ball sockets 24 and the upper end of the milk hose support arm 10 engaged in the vertical rod channels 22. The adjustment bolt 20 is then inserted and tightened to complete the assembly securing the milk hose support arm 10 to the cow stall mounting rail 38 with the ball and socket arm clamping assembly 14 therebetween as shown in FIG. 2. Furthermore, by proper tensioning of the adjustment bolt 20 through the socket member halves 18, and particularly with the socket member halves and the ball 16 formed of a self-lubricating plastic, the compressive engagement of the socket member halves over the ball may be predicated such that the milk hose support arm 10 may be selectively moved in virtually all horizontal and angular vertical positions beneath the cow stall mounting rail 38 and relative to the stationary position of such cow stall mounting rail by relatively forceful movements, yet the milk hose support arm will be firmly retained in any given position once so positioned. If the forces between the ball 16 and socket member halves 18 are too great to accomplish such movement of the milk hose support arm 10, a slight loosening of the adjustment bolt 20 will permit the same.

As shown in FIG. 1 in the specific use of this first embodiment form of the radial arm milk hose support construction of the present invention, a usual milking claw generally indicated at 54 of an automatic milker or milking system is properly positioned operably attached to the udder 56 of the cow 50. Hoses 58 of the milking claw 54 are directed through and engaged by the hook 12 of the milk hose support arm 10 so that not only are these hoses supported by the support arm by the universal movement provided by the ball and socket assembly as described, but the exact proper tension may be exerted on these hoses and the milking claw 54 through such movement so as to produce a maximum milk-out of the particular cow 50. This ready universal adjustment of the milk hose support arm 10 of the present invention, as opposed to the required complex multiple adjustments of the prior constructions, therefore, provides a more efficient cow milking operation.

Figure 4:
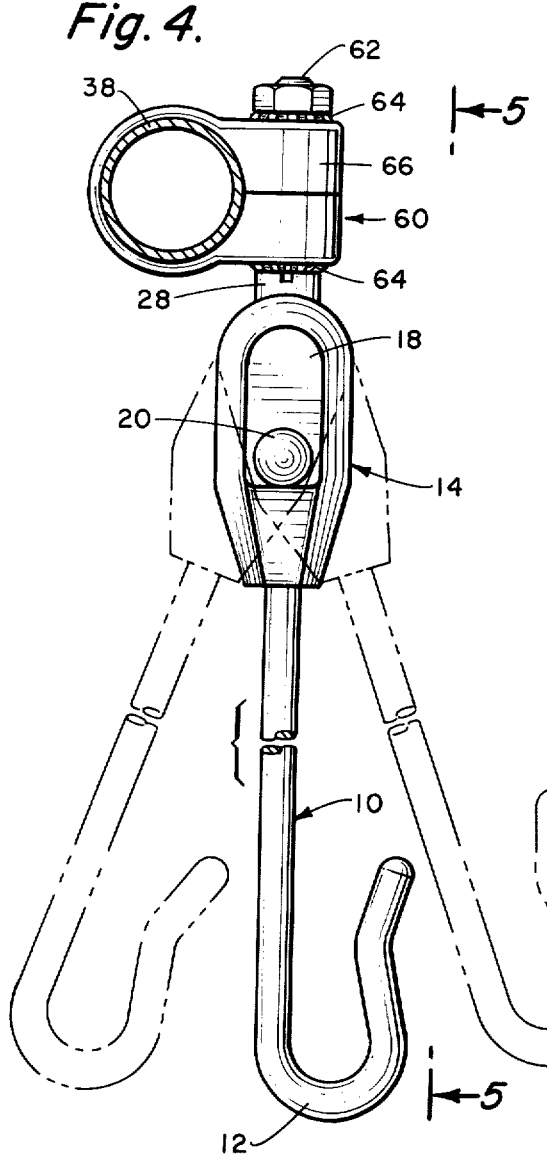
FIG. 4 is a fragmentary, side elevational view of an alternate form of radial arm milk hose support construction according to the principles of the present invention, various adjusted positions of the milk hose support arm thereof being illustrated in phantom lines.
Figure 5:
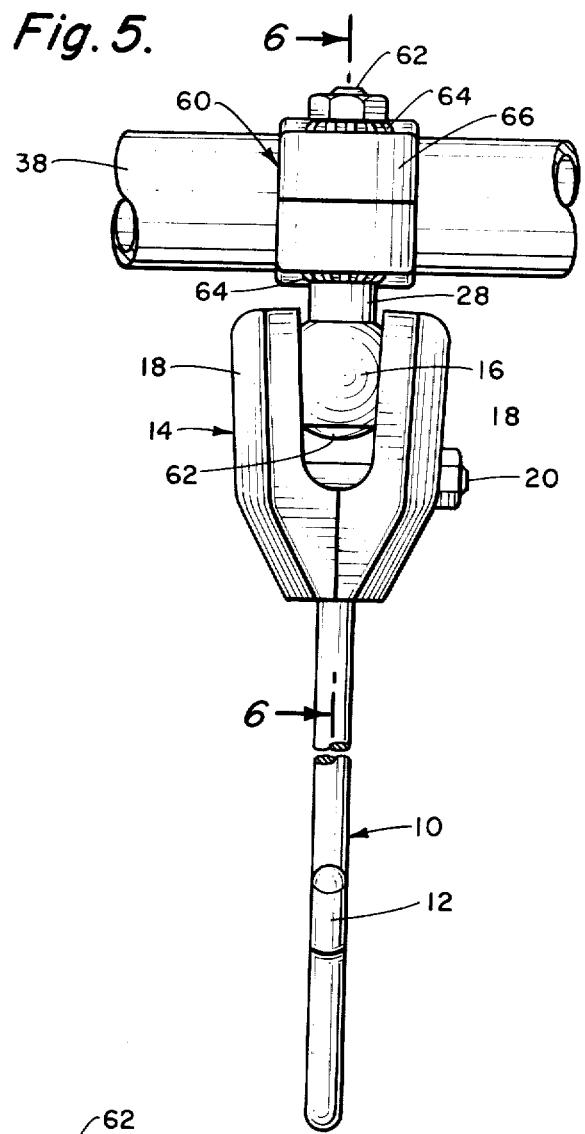
FIG. 5 is an elevational view taken at right angles to the view of FIG. 4 and looking in the direction of the arrows 5—5 in FIG. 4.
Figure 6:
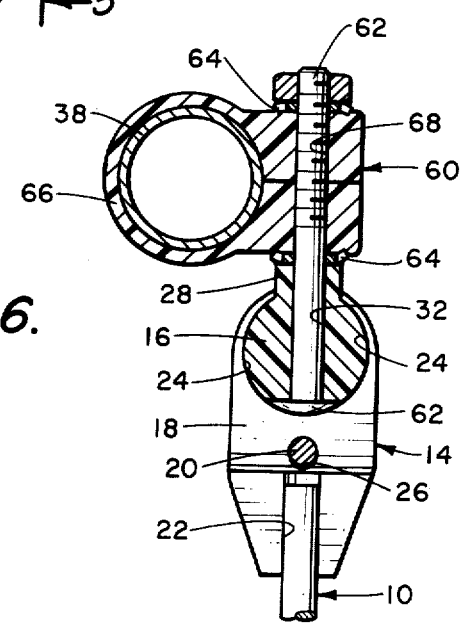
FIG. 6 is an enlarged, fragmentary, vertical sectional view looking in the direction of the arrows 6—6 in FIG. 5.

The second embodiment of the radial arm milk hose support construction of the present invention is shown in FIGS. 4, 5 and 6, and is quite similar to the first embodiment form including the same milk hose support arm 10 and the universally moveable arm clamping assembly 14, that is, the same ball 16, socket member halves 18 and adjustment bolt 20. Different from the first embodiment form, this second embodiment form includes an arm mounting assembly generally indicated at 60 comprised of a mounting bolt 62, washers 64 and a mounting strap 66 having a vertical opening 68 formed therethrough. As shown, the mounting strap 66 is positioned around the cow stall mounting rail 38 at the determined general location, the washers 64 placed at the upper and lower sides of the mounting strap and the mounting bolt 62 secured upwardly through the opening 32 of the ball 16 and through the opening 68 of the mounting strap 66. This clamps the mounting strap 66 at the desired location along the cow stall mounting rail 38 and secures the ball 16 transversely adjacent this mounting rail with the remainder of the assembly including the milk hose support arm 10 extending downwardly therefrom.

This second embodiment form, therefore, in addition to the before-described advantageous universal milk hose support arm movement provides the additional advantage of not requiring any mounting openings through the cow stall mounting rail 38. Thus, by use of the mounting strap 66, the milk hose support arm 10 may be positioned at any desired location along the cow stall mounting rail 38 and clamped in place to provide the same universal support arm movements. Furthermore, the mounting strap 66 may be formed of plastic, such as nylon, for the inherent flexibility thereof and convenience of formability.

According to the principles of the present invention, therefore, several forms of a radial arm milk hose support construction are provided which mounts a milk hose support arm 10 extending downwardly from a cow stall mounting rail 38 with convenient single adjustment, universal movement for adjusting the support arm to properly retain and tension the hoses 58 of a milking claw 54 in an automatic cow milking system, and the complex multiple adjustment disadvantages of the prior constructions is completely eliminated. Additionally, the efficiency of the single, universal adjustment is enhanced in the preferred form by fabricating the ball 16 and socket member halves 18 of such constructions from a self-lubricating plastic clamping the milk hose support arm 10 in any of its universal determined positions while still permitting ready, quick adjustments by the application of sufficient forces to the support arm. In this manner, the radial arm milk hose support construction of the present invention greatly adds to the convenience and efficiency of an automatic cow milking operation.

We claim:

1. In a radial arm milk hose support construction for supporting milk hoses of automatic milkers at the cow stalls; the combination of: a generally vertically downwardly projecting milk hose support arm supported projecting generally downwardly from a generally horizontal cow stall mounting rail and having hose engagement means at a lower end portion thereof for transversely engaging and supporting milk hoses connected to an automatic milker claw; universally selectively adjustable arm clamping means mounted between an upper end of said support arm and said generally horizontal cow stall mounting rail including a rigid self-lubricating plastic ball member secured to said cow stall mounting rail by a mounting bolt extending diametrically upwardly through said ball member and upwardly generally to said cow stall mounting rail, a sleeve telescoping said mounting bolt between said ball member and said cow stall mounting rail, a socket member formed of two transversely separable rigid self-lubricating plastic socket member halves upwardly transversely socket telescoping said ball member and downwardly transversely telescoping said support arm upper end, adjustment bolt means extending transversely through said socket member halves positioned vertically between said mounting bolt and said support arm upper end for transversely clamping said socket member halves over said support arm upper end and for frictionally engaging said socket member halves over said ball member permitting said universal adjustment therebetween to adjust and frictionally retain said support arm in all selected downwardly extending directions relative to said cow stall mounting rail.

2. In radial arm milk hose support construction as defined in claim 1 in which said ball member mounting bolt extends diametrically through said cow stall mounting rail above said sleeve securing said ball member and sleeve to said cow stall mounting rail.

3. In radial arm milk hose support construction as defined in claim 1 in which a mounting sleeve circumferentially surrounds a portion of said cow stall mounting rail and receives said ball member mounting bolt therethrough above said telescoping sleeve and transversely adjacent said cow stall mounting rail securing said ball member and said telescoping sleeve to said mounting rail.

* * * * *